(12) United States Patent
Ganesh et al.

(10) Patent No.: US 6,347,087 B1
(45) Date of Patent: Feb. 12, 2002

(54) CONTENT-BASED FORWARDING/ FILTERING IN A NETWORK SWITCHING DEVICE

(75) Inventors: Jayansenan Sundara Ganesh, Veradale; Timothy S. Michels, Spokane; James E. Cathey, Greenacres, all of WA (US)

(73) Assignee: Packet Engines Incorporated, Spokane, WA (US)

( * ) Notice: Subject to any disclaimer, the term of this patent is extended or adjusted under 35 U.S.C. 154(b) by 0 days.

(21) Appl. No.: 09/166,318

(22) Filed: Oct. 5, 1998

(51) Int. Cl.$^7$ .......................... H04J 15/00; G06F 13/38
(52) U.S. Cl. .................. 370/392; 370/401; 713/154
(58) Field of Search .................. 370/230, 235, 370/236, 389, 392, 395, 400, 401, 411, 497, 498; 713/153, 154

(56) References Cited

U.S. PATENT DOCUMENTS

| | | | | |
|---|---|---|---|---|
| 5,473,607 A | * | 12/1995 | Hausman et al. | 370/389 |
| 5,608,662 A | * | 3/1997 | Large et al. | 364/724.01 |
| 5,951,651 A | * | 9/1999 | Lakshman et al. | 709/239 |
| 5,959,976 A | * | 9/1999 | Kuo | 370/257 |
| 5,999,530 A | * | 12/1999 | LeMaire et al. | 370/390 |
| 6,061,368 A | | 5/2000 | Hitzelberger | 370/537 |
| 6,147,976 A | * | 11/2000 | Shand et al. | 370/254 |

OTHER PUBLICATIONS

"Switching Basics," *High–Speed Networking with LAN Switches*, by Gilbert Held, chapter 2, pp. 33–61 (1997).
"Frame Switching, Routing, and Protocols," *Fast Ethernet*, by Liam B. Quinn and Richard G. Russell, chapter 7, pp. 109–147 (1997).
"Switched Ethernet and Fast Ethernet Standards," *Switched and Fast Ethernet: How It Works and How to Use It*, by Robert Breyer and Sean Riley, chapter 3, pp. 41–78 (1995).
Bransky, Jonathan and Passmore, L. David, Layer 4 Switching, White Paper, published at http://www.decisys.com/Documents/WhitePapers/L4_switching (Sep. 1997).

* cited by examiner

*Primary Examiner*—Ricky Ngo
(74) *Attorney, Agent, or Firm*—Christie, Parker & Hale, LLP

(57) ABSTRACT

A method of processing frames received at a sending port of a switching device for communication to a destination port includes storing in the switching device an offset value, a comparator value, and an expectant value; comparing information located at a position in a frame determined by the offset value with the comparator value to obtain an outcome; and processing the frame with the outcome. Processing the frame may include communicating the frame to a destination port or setting the priority of the frame. The offset and comparator values may be part of a filter that also includes an anchor value from which the offset value is measured and a mask value that masks the frame information before comparison with the comparator value. Where there are a multiple of filters in the switching device, the method may include combining the filter outcomes to obtain a filter group outcome; and processing the frame with the group outcome. Combining the filter outcomes may include logically combining their outcomes. The method may also include merging the outcome with frame forwarding information from another source; and processing the frame with the merged outcome. Apparatus in accordance with the invention practices these methods.

23 Claims, 9 Drawing Sheets

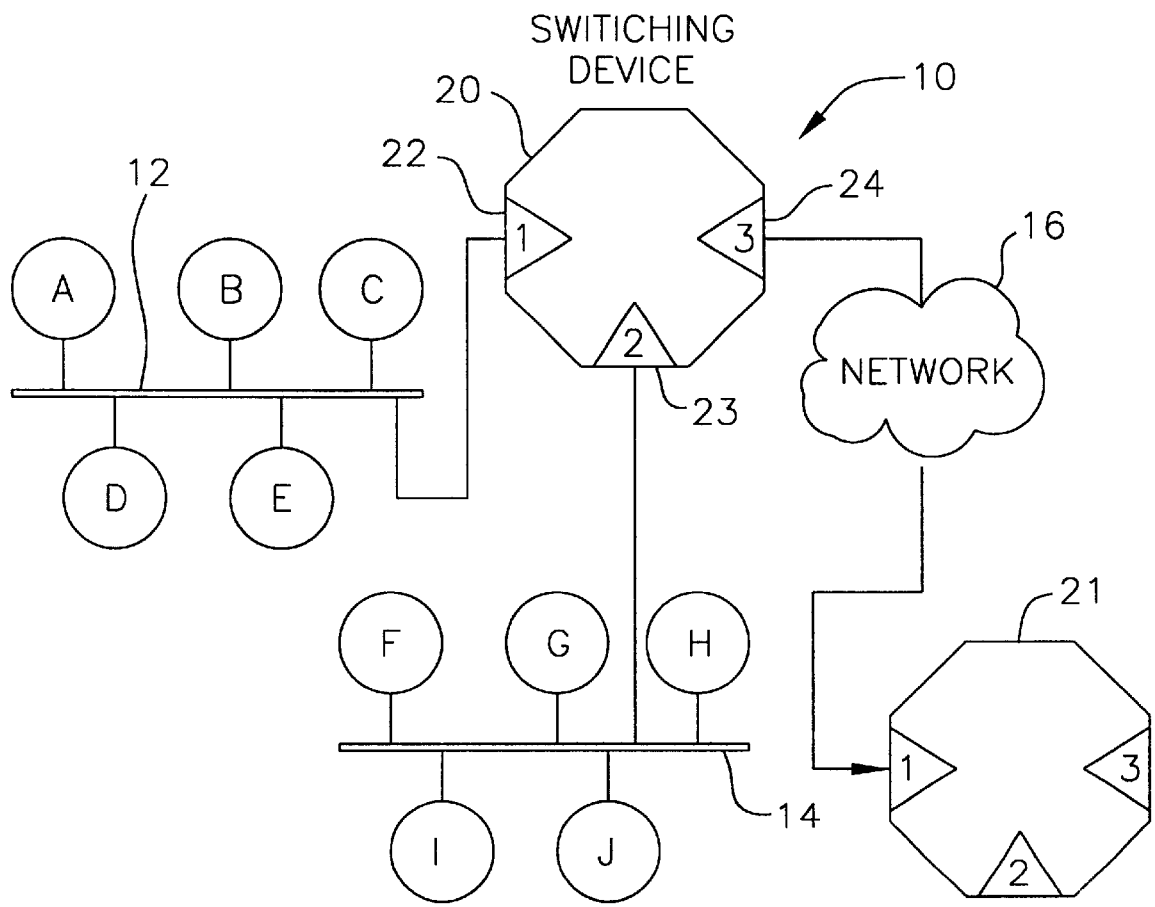

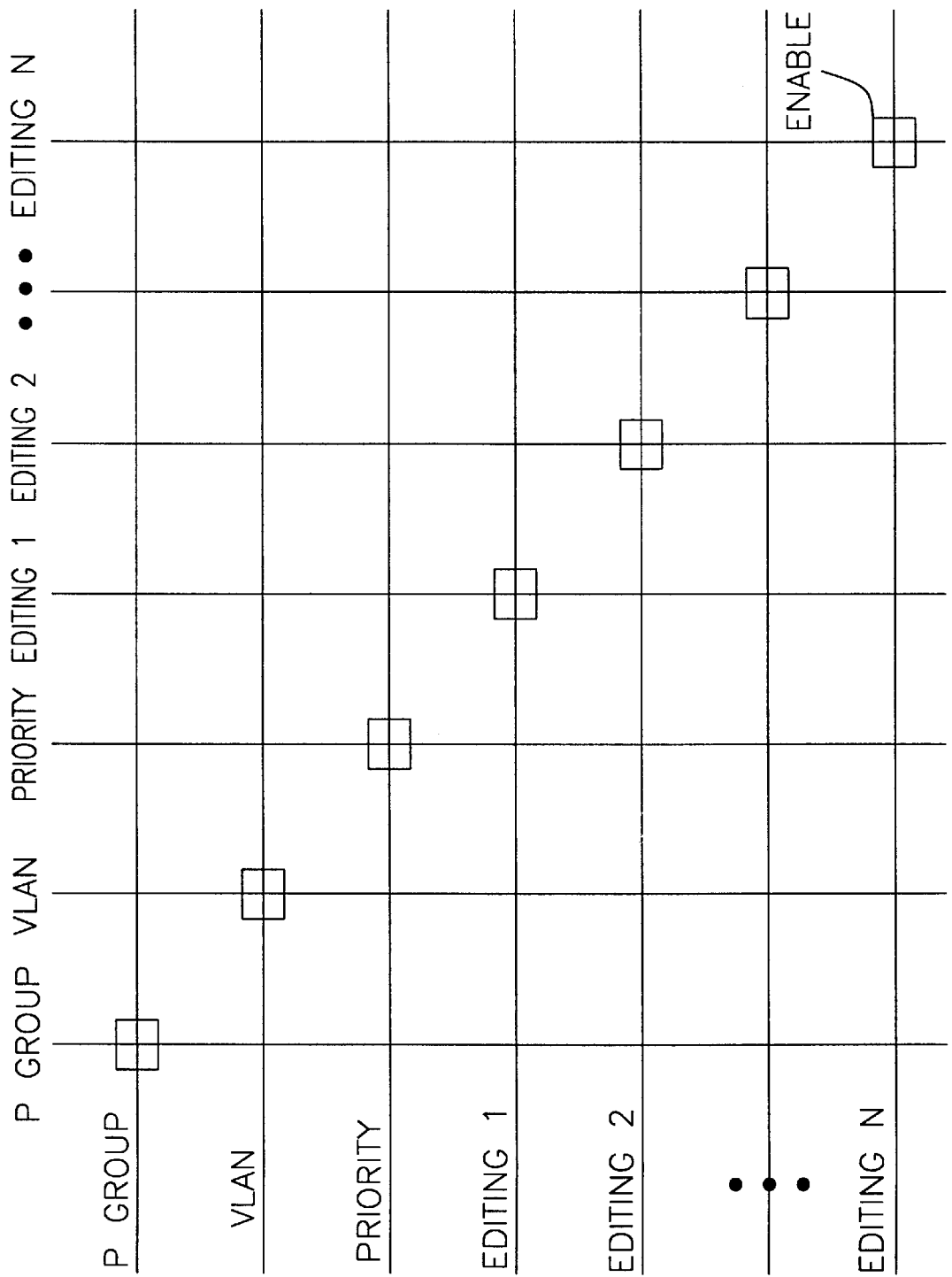

CONTENT-BASED FORWARDING/ FILTERING IN A NETWORK SWITCHING DEVICE

TECHNICAL FIELD

This invention relates generally to network switching devices. More particularly, this invention relates to a method and means for forwarding or filtering data packets (frames) through a switching device based on the content of the frame.

BACKGROUND OF THE INVENTION

A local area network (LAN) is a system for directly connecting multiple computers so that they can directly exchange information with each other. LANs are considered local because they are designed to connect computers over a small area, such as an office, a building, or a small campus. LANs are considered systems because they are made up of several components, such as cables, repeaters, switches, routers, network interfaces, nodes (e.g., computers), and communication protocols. Ethernet is one such protocol. Information is communicated through a LAN in frames transported within data packets. ("Frame" and "data packet," while technically different, are often used interchangeably to describe data carrying the information.)

A LAN switch (or, more generally, a packet switch) is generally defined as a multi-port device that transfers data between its different ports based on the destination addresses and/or other information found in the individual packets it receives. Switches can be used to segment LANs, connect different LANs, or extend the collision diameter of LANs. Switches are of particular importance to Ethernet-based LANs because of their ability to increase network diameter. Additional background information on packet switches can be found in a number of references such as *Fast Ethernet* (1997) by L. Quinn et al., *Computer Networks* (3rd Ed. 1996) by A.Tannenbaum, and *High-Speed Networking with LAN Switches* (1997) by G. Held, all of which are incorporated herein by reference.

Within a network routing/switching device there exists a path wherein individual frames received at an entry port are directed to pass through an address-lookup logic in order to forward the frames to their appropriate exit ports. Traditionally, this path is used to do routing or switching of frames based on the source and/or destination address field(s) present in the frame. An example is bridging a frame based on its destination MAC address. Another example is routing a frame based on its destination IP address.

It may be desirable, however, to route frames based in whole or in part on their content other than destination addresses, such as their data. To do so requires that the frame's contents be examined and evaluated. Prior approaches to content-based routing of frames, though, have been too slow and limited in scope.

An objective of the invention, therefore, is to provide an improved method and means for routing, switching or filtering frames based on information derived from the contents of some or various parts of the frame, not limited to destination addresses.

SUMMARY OF THE INVENTION

In accordance with the invention, a method of processing frames received at a sending port of a switching device for communication to a destination port includes storing in the switching device an offset value and a comparator value, comparing information located at a position in a frame determined by the offset value with the comparator value to obtain a filter outcome; processing the frame with the outcome. Processing the frame may include communicating the frame to a destination port or setting the priority of the frame. The offset and comparator values may be part of a filter that also includes an anchor value from which the offset value is measured and a mask value that masks the frame information before comparison with the comparator value.

Where there are a multiple sets of offset and comparator values in the switching device, the method may include combining the outcomes to obtain a group outcome and using the group outcome to process the frame. Combining the outcomes may include logically combining their.

The method may also include merging the outcome with frame forwarding information from another source as a search engine and associated memory; and using the merged outcome to process the frame.

Apparatus in accordance with the invention practices these methods. Such apparatus includes components such as means for storing in the switching device an offset value and a comparator value, means for comparing information located at a position in a frame determined by the filter offset value with the comparator value; and means for processing the frame with the outcome.

These and other aspects, features, and advantages of the invention are described in an illustrative embodiment below in conjunction with the following drawings.

BRIEF DESCRIPTION OF THE DRAWINGS

FIG. 1 is a block diagram of an exemplary computer network including a switching device.

FIG. 2 is an exemplary look-up table in a switching device for determining a destination port.

FIGS. 6A and 6B are block diagrams of the merge logic of FIG. 3.

DETAILED DESCRIPTION OF AN ILLUSTRATIVE EMBODIMENT

Overview

Figure 3:
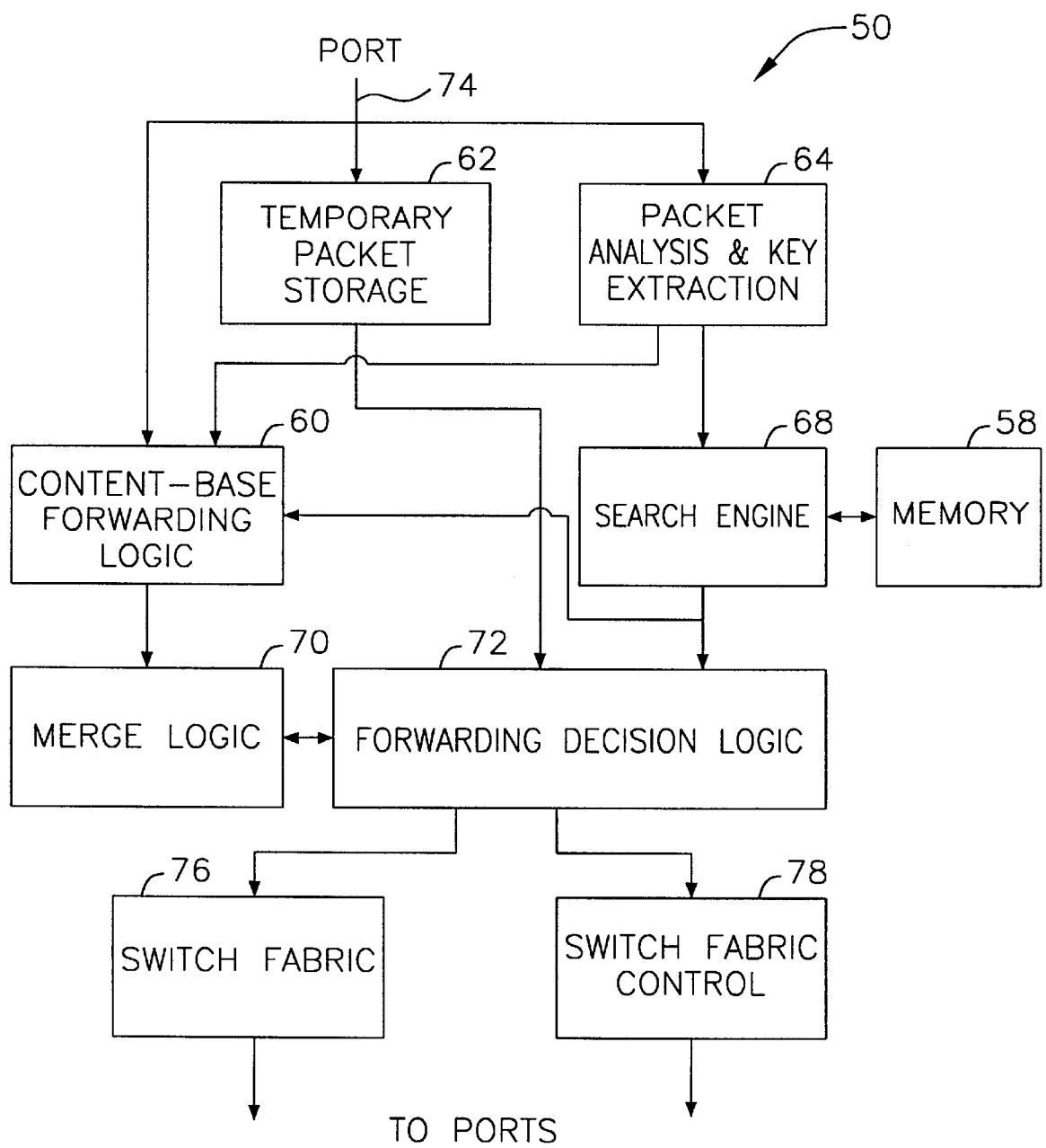
FIG. 3 is an block diagram of a pertinent portion of a packet switch in accordance with the invention.

In the following description, a "policy" corresponds to a filter within a packet switch for filtering a frame. A "policy-expression" corresponds to the outcome of logically combining one or more filter outcomes in determining what action to take in response to reception of a frame.

The information so derived is in turn based upon the result of the application of Policy-expressions on the frame. Policy-expression is defined as a Boolean expression involving various policy results as variables. Example policies are "match", "do not match" etc.

Policy Representations

Policy is represented as

Policy:={expectant, offset, length, anchor, mask, comparator } "expectant" is in turn represented as expectant:={match | no-match | greater-than | lesser-than } "offset" is a byte or word offset into the frame from the beginning of a predefined "anchor"-point within the frame. Typical anchor-points are:
1) Beginning of a frame
2) Beginning of a Layer-2/Layer-3 or any other layer header
3) End of a Layer-2/Layer-3 or any other layer header
4) A fixed byte-offset from the beginning of the frame "length" is a value which is measure of the word length of the offset word being sought.

"mask" is a value which is AND/OR/NAND/NORed with the frame's content present at its "offset" location as described above. Typically the mask is used to omit various unwanted bits present in the content bytes for the purposes of applying the policy.

"comparator" is a value which is to be compared against the resultant content bytes after the application of "mask" in order to derive one of the "expectant" values. If the expectant value matches the comparison, then the policy succeeds.

Policy-expression

Policy-expression consists of two parts, namely, an expression and resultant-actions.

Policy-expression:={expression, actions }

"expression" is a Boolean/combinatorial-logic expression using operators like INVERT, AND and OR and various "policies" as its variables. For example, any two or more policies can be combined using INVERT, AND, and OR to form a Boolean expression resulting in a TRUE or FALSE condition, as described below.

When the expression's result is TRUE, resultant-actions are applied to the frame being handled. There are various resultant-actions one can take. Examples are: raising or lowering the priority of the frame, forward it to a particular port, filter it, modify it with a signature and/or send an unaltered copy of the frame to another port. These results can be optionally merged with the results of a traditional lookup as well.

A Detailed Example

Assuming that one wants to do content-based routing based on the following information:

Filter to 'port-x' if a frame has '8' in the lower-nibble at byte-offset 7 or '9b' present at offset 14 and '50' not present at offset 30.

For the following frame:
00 01 01 67 39 03 48 56 72 87 a7 e8 3e fc 9b 1a dd 41 50 48 54 43 3D 5C 3A 4D 4A 53 50 52 54

P1={match, 7, frame-start, 0x0F, 0x08 }
P2={match, 15, frame-start, 0xFF, 0x9b }
P3={no-match, 30, frame-start, 0xFF, 0x50 }

Policy expression is:
{P1 & {P2 | P3}}=Action(Filter)

In the above example, P1 succeeds (offset 7 has a byte value of 0x48 and when a mask of 0x0F is applied, it matches with 0x08), P2 succeeds and P3 fails. Since P1 and P2 succeed, the above policy-expression succeeds and hence the action of "filter" is taken on the frame.

Though the above example uses only 3 policies, this scheme does not limit the number of policies or the scope of the combinatorial logic to any small number.

One important aspect of the above scheme is that this described scheme is entirely programmed into ASIC so that content-based forwarding/filtering is accomplished for every frame at wirespeed without any intervention from any microprocessor directly or indirectly connected to the ASIC. Following appendix gives finer details of one such implementation.

Structure, Function, and Operation

A network allows two or more parties to communicate with each other. In their simplest form, networks generally include transmission lines and switching devices (e.g., routers, switches, switching routers, etc.). The transmission lines carry signals (e.g., electrical, optical, etc.), while the switching devices are intermediate stations that establish temporary connections between transmission lines. In telephone networks, for example, a caller's line goes to a switching device where the actual connection is made to the called party. In computer networks, devices such as routers receive messages on the network and forward the messages to their correct destinations. Computer networks can be as small as a local area network (LAN) consisting of a few computers, printers, and other devices, or it can consist of many computers distributed over a vast geographical area (e.g., the Internet).

An exemplary computer network 10 is shown in FIG. 1. The network includes two local segments 12 and 14, and connection to a remote network 16. Nodes, labeled as A–J, represent computers connected to the local segments. A switching device 20 includes three ports 22–24 and switches network traffic between segments 12, 14, and the remote network 16. Network 16 may also include switching devices, such as switching device 21, which then connects other segments (not shown) to the network. Switching device 20 allows the nodes on one segment to communicate with nodes on other segments and to other switching devices. The nodes communicate with each other through a protocol (e.g., HTTP, TCP/IP, SMB, etc.) which allows the nodes to transmit and receive network frames (a network frame includes a destination address, a source address, and a data field). When switching device 20 receives a frame from a node, it analyzes the destination address by searching a lookup table 26, shown in FIG. 2. Lookup table 26 includes table entries having a network address field and a port field. When the destination address is matched to a network address in the lookup table, switching device 20 determines which port to forward the frame to by obtaining the port number corresponding to the matched network address. For example, if node A on segment 12 sends a message to node H on segment 14, switching device 20 receives the message from node A and in response searches the entries in the network address field of lookup table 26. Table entry 28 contains the network address for H. A corresponding port field 30 for network address H indicates that the frame should be forwarded over port 2.

The switching device can obtain the network addresses for the lookup table in different ways, depending on the particular implementation of the switching device. For example, the switching device may snoop network traffic so that when a frame is received on a port, the switching device determines if the frame's source address is in the table and, if it is not, adds an entry containing the source address and the inbound port to the table. Thus, the switching device is said to "learn" addresses and port numbers from any frame that is transmitted by a node. Another technique some switching devices (e.g., routers) use to obtain the lookup table is from other switching devices through a special protocol. Thus, routers supply network addresses to each other to supplement their lookup tables.

Consequently, when a network frame is received in a switch, both the source and destination addresses must be searched in the lookup table—the source address for "learning" and the destination address for forwarding. To search the lookup table, a search engine (not shown) within the switch 20 sequentially accesses lookup table entries and compares the entries to the destination address in the network frame. After the search for the destination address is completed, a second search is performed for the source address.

FIG. 3 shows a port of a switching device 50 and related logic. Pertinent to this invention are a memory 58, content-based forwarding logic 60, temporary packet storage 62, packet analysis and key extraction logic 64, a search engine 68, merge logic 70, and forwarding decision logic 72. There are multiple ports (not shown) in switching device 50. The number of ports and how they are structured within the switching device are implementation specific and not germane to the invention.

The port connects switching device 50 to a network (not shown) through a network cable 74. The network cable can take a variety of forms (e.g., fiber optic, twisted-pair, coaxial, etc.) depending on the type of network. A variety of network standards and protocols may be used, such as TCP/IP, IPX/SPX, FDDI, ATM, ETHERNET, GIGABIT ETHERNET, FAST ETHERNET, Token Ring, SONET, 100-base TX, etc. Other network protocols, standards, and network cables now existing or later developed may be used with the invention. The network cable communicates frames to the port which in turn communicates them to packet storage 62, search engine 68, and forwarding logic 60.

Temporary packet storage 62 holds the network frame temporarily while other components within the search engine determine where to forward the network frame to, as is further described below. In some circumstances, a decision may be made to not forward the packet at all. In such cases, the network frame is never passed to the port intercommunication logic. Depending on the size of the network frame, the temporary packet storage 62 may hold several network frames, or, alternatively, only a portion of a network frame as it is forwarded to another port.

Packet analysis and key extraction logic 64 extracts the source and destination addresses from the network frame and forwards the addresses to the search engine 68. The packet analysis and key extraction logic 64 may also pass additional information to the search engine 68, such as virtual LAN information that comes with the network frame or is derived based on the type of network frame. This additional information is appended to the source and destination addresses to form a key. One skilled in the art will recognize that the key may include any desired information, depending on the particular application. For example, the key may contain only the destination address, or only the source and destination addresses, or the source and destination addresses and additional information. For simplicity, the key is described generically below as being the source and destination addresses.

Search engine 68 is coupled to memory 58. The memory stores a lookup table that the search engine uses for analyzing network frames received from media interface 56. A management processor (not shown) is coupled to search engine 68 and maintains the lookup table in memory 58. Specifically, the management processor may direct the search engines to delete old table entries, insert new table entries and generally maintain the table in sorted order so that the search engine 68 performs searches efficiently and correctly.

After search engine 68 completes the search, the results are passed to forwarding decision logic 72, which examines the results and applies a predetermined set of rules to determine whether the network frame should be forwarded and which port or ports it should be forwarded to. Forwarding decision logic may also examine the level of priority of the network frame. Higher priority frames are typically forwarded by the switching device 50 before lower priority frames.

Incoming frames are also evaluated by content-based forwarding logic 60 in accordance with the invention. Based on that evaluation, the frame can be processed in a number of ways such as changing its priority, redirecting it to another port, etc. Unlike the search engine 68, forwarding logic 60 can look at the content of the frame other than the destination address. The results of the evaluation are then passed to merge logic 70. Logic 70 merges the results from forwarding logic 60 with the results from search engine 68 as commanded: merge (or not merge) in a number of ways, such as overwriting the priority determined by the search engine 68 with the priority determined by the forwarding logic 70.

Switch fabric control 78 controls network frames as they are passed through the switch fabric. In the case where the switch fabric is a cross-bar switch, the switch fabric control is typically called a scheduler. The scheduler establishes a connection within the cross-bar switch so that a search engine on one port can directly pass a network frame to a search engine on another port. In the case where the switch fabric is a memory, the switch fabric control tells a receive-side search engine where to store the frame in memory. After the frame is stored in memory, the switch fabric control signals a transmitting-side port that the network frame is ready to be transmitted and provides the address of the memory location where the frame in located. The switch fabric control may also provide priority information to the transmitting-side port.

Figure 4:
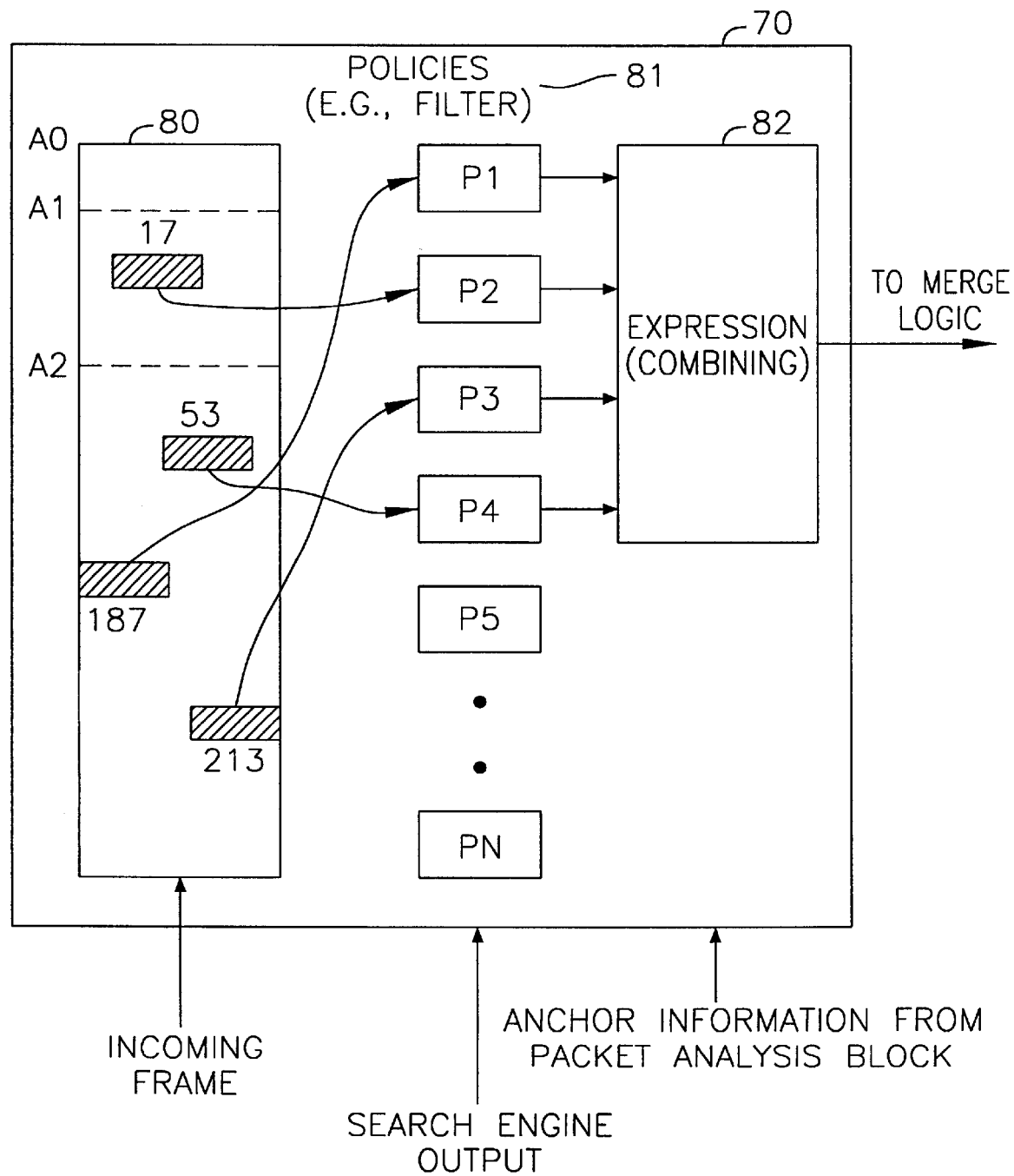
FIG. 4 is a block diagram of the content-based forwarding logic of FIG. 3.

FIG. 4 is a block diagram of an embodiment of content-based forwarding logic 70. The logic includes a window 80 or equivalent technique for viewing the contents of a frame as it streams by. The window has marked thereon several anchor points A0, A1, A2, etc., that are communicated to the logic by the packet analysis block 64. Filters 81 (policies) within active groups monitor the window 80 to detect information located at a position in a frame determined by the filter offset value (frame word(s) of interest). In FIG. 4, for example, P1 captures the frame word(s) beginning at offset 1877 from anchor A2, P2 captures the frame word(s) beginning at offset 17 from anchor A1, P3 captures the frame word(s) beginning at offset 213 from anchor A0, and P4 captures the frame word(s) beginning at offset 53 from anchor A0.

The filters then generate an outcome depending upon their settings, and pass these outcomes to an expression 82, which combines them in a given way to produce a result. The results is an action to be taken to process the frame, such as to change its priority or add to or change its destination.

Figure 5:
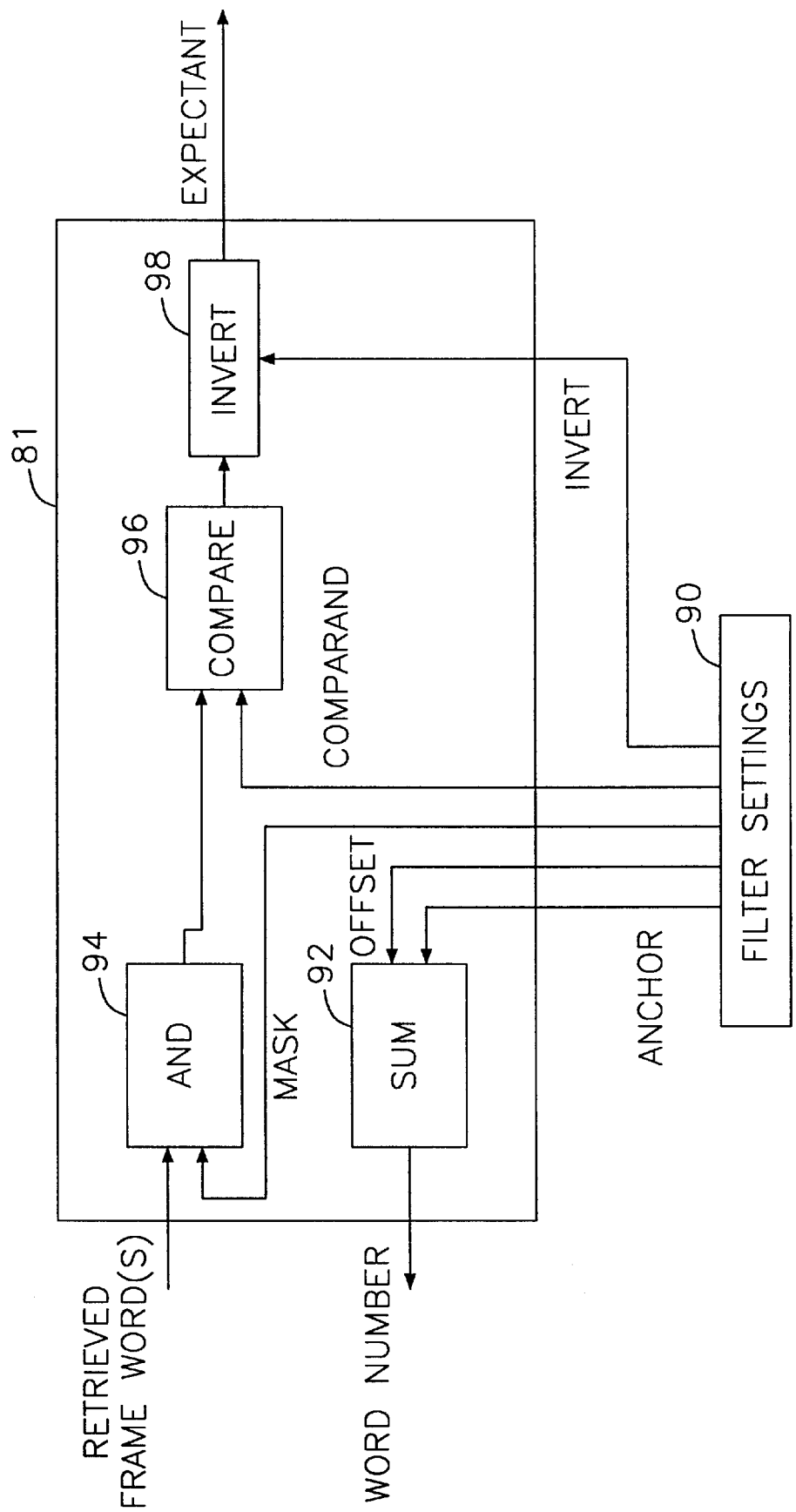
FIG. 5 is a block diagram of a filter of FIG. 4.

FIG. 5 is a block diagram of a filter 81 such as P1 in FIG. 4. Filter settings 90 represents the values the filter receives from registers and other source for its expectant, offset, anchor, mask, and comparator. The filter determines from the anchor and offset which word in the frame is of interest (SUM 92) and looks for this word in the frame. The retrieved word(s) are then ANDed with the mask value (AND 94)to provide data for comparison with the comparand (COMPARE 96). The outcome of the comparison forms the expectant, which is a logic one if there is a match and a logic zero if there is not. If a no-match is desired, then the comparator output is inverted (INVERT 98), so that no-match generates a logic one.

Returning to FIG. 4 and FIGS. 7–9, it can be seen how filters are selected for inclusion in various groups and how the expression 82 can be structures to take action based on filter outcomes.

Figure 6A:
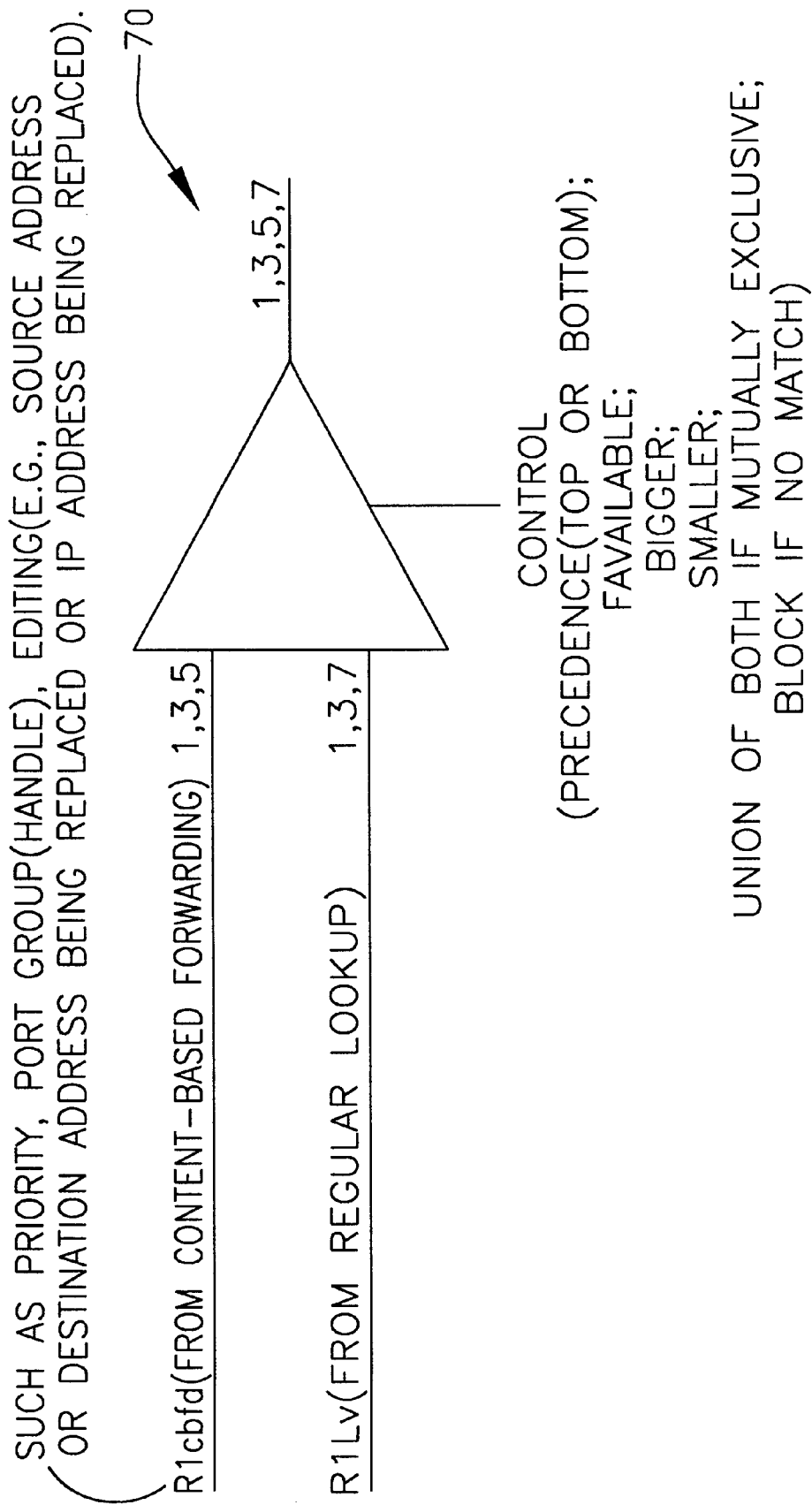

FIGS. 6A and 6B show and describe a particular form of the merge logic for merging the outcome of the forwarding decision logic 70 with the search engine 68.

In the illustrative embodiment, 64 offset/mask forwarding filters are implemented in an application-specific integrated circuit (ASIC) that form the content-base forwarding logic. Each filter guarantees the ability to match a 64-bit word placed on any bit boundary within a desired number of bytes such as the first 256 bytes of a frame, or within any L3 payload therein. Any bits of this word can be masked off so that only the remaining bits will determine the match result. To implement this, each filter has an offset count value for filter placement, a comparand word, a mask word, a length of the frame word to be evaluated, a port sensitivity enable bit, and a Protocol selector.

An Offset Mask Filter works by indexing into either the raw (L2) frame or its L3 payload (if any) the number of words indicated by its offset count value. Once this start point is reached, the filter compares the length-defined words of the frame against its word comparand and mask values. If all of the unmasked bits match up then a filter match occurs. (Additional qualifications based on input port number and/or Protocol are available.)

Figure 7:
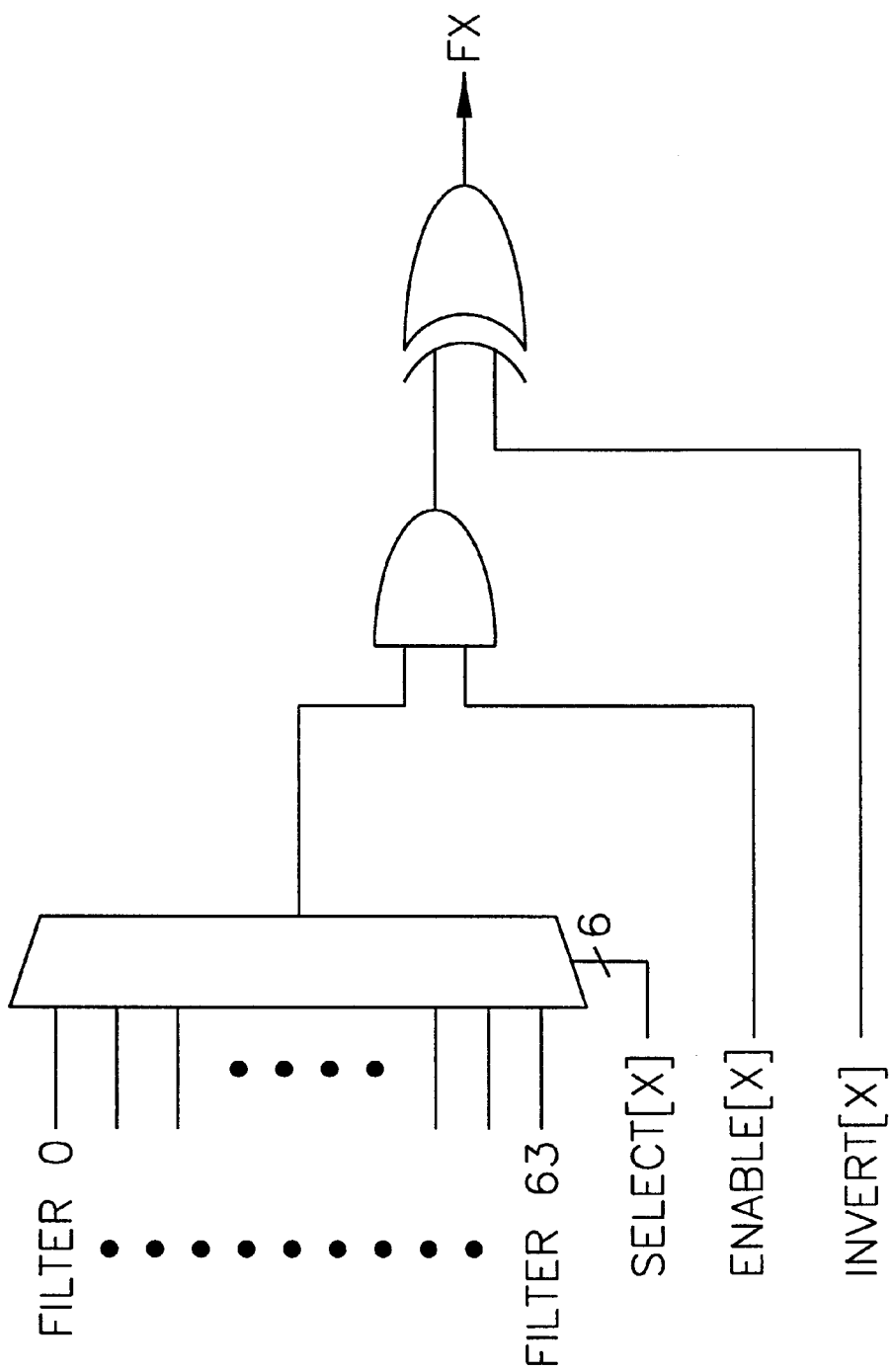
FIG. 7 is a logic diagram illustrating the method for including or excluding a filter from a group.

The 64 single filters are further grouped into 16 sets of from 1 to 8 filters each. These 8 filters may be chosen from any of the 64, and a filter may be shared by more than one group. Each group of filters has a control field and a forwarding vector associated with it. The control field has an enable bit for each of its filters. When a filter is disabled, its match result will be forced to failure. A separate per-filter invert bit allows the result from each filter to be passed through unchanged or inverted. A diagram of one of the eight inputs to a filter group is shown in FIG. 7.

A group of eight logic control bits determine how the results of the filters are combined. The first bit determines if filter 0 result (F0) will be ANDed or ORed with F1. The second, third, and fourth bits likewise control the gating of F2 to F3, F4 to F5, and F6 to F7. The fifth, sixth, and seventh bits control the gating together of these four results. The eighth bit selects a grouping mode (described later). The basic logic control sequence is shown in the following equation. A +/* is OR/AND and the subscript indicates the controlling bit position:

Group Result=((F0+/*$_0$F1)+/*$_4$(F2+/*$_1$F3))+/*$_6$((F4+/*$_2$F5)+/*$_5$(F6+/*$_3$F7))

Figure 8:
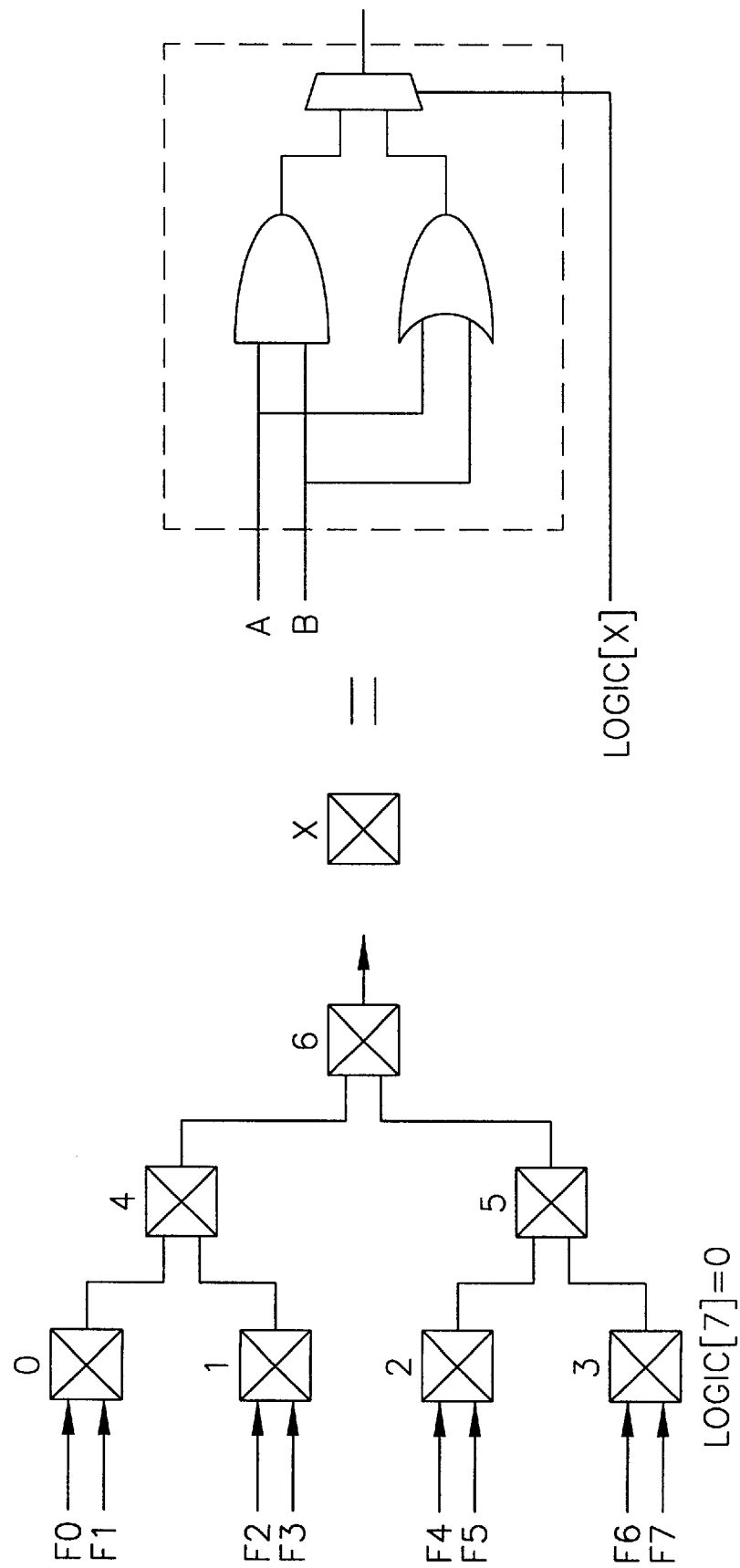
FIG. 8 illustrates the basic combination of filters in a group.

The basic filter operation map, active when the 8$^{th}$ logic bit (bit 7) is 0, is shown in FIG. 8.

Figure 9:
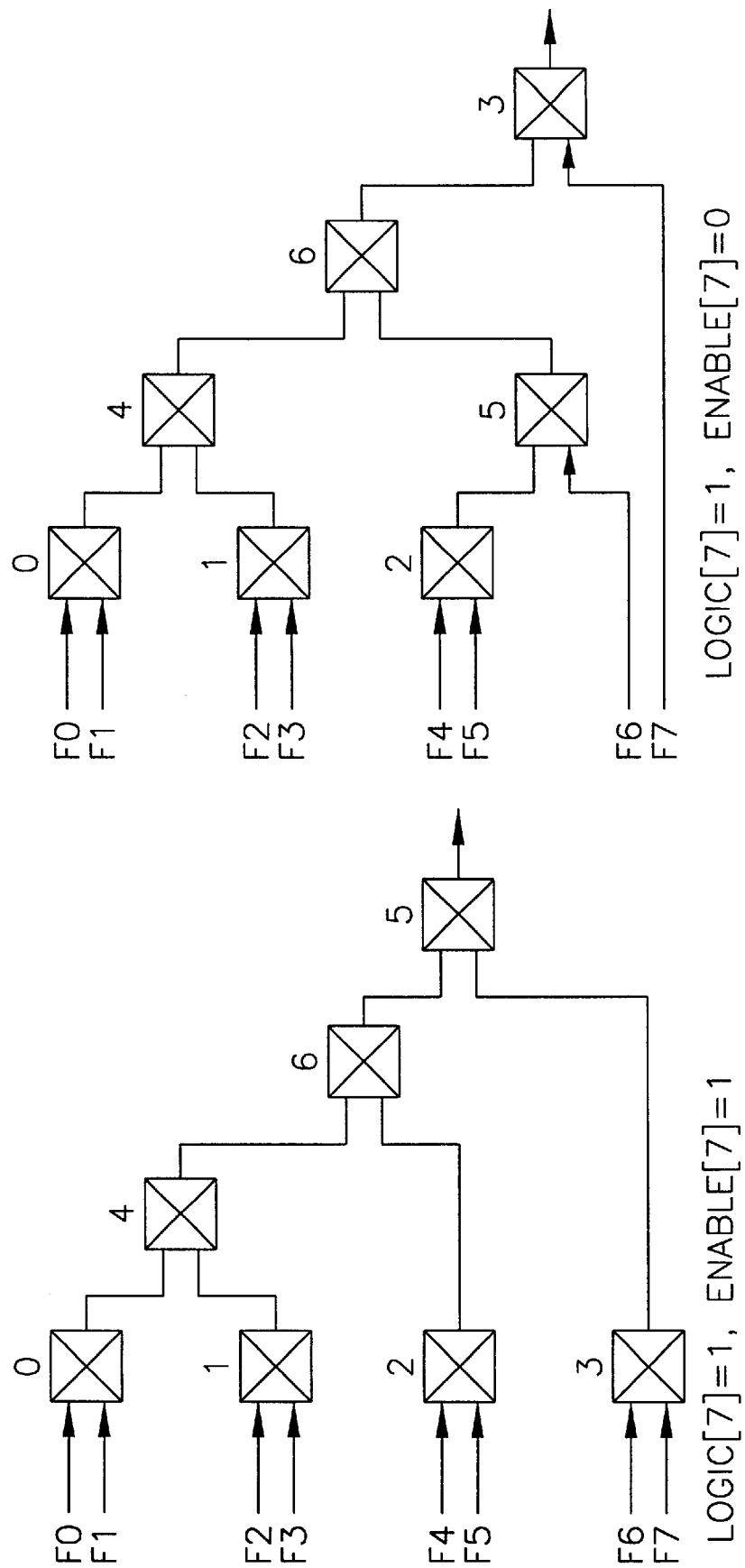
FIG. 9 illustrates two variants on the basic combination of FIG. 8.

Because this is somewhat inflexible (you can only AND a filter with up to 4 ORed filters, wasting up to three filters), there are two variant modes selected when the 8$^{th}$ logic bit is, shown in FIG. 9. This allows for up to 6 (or 7) ORed terms ANDed with 2 (or 1) terms.

When the group result logic yields a true condition a group match occurs. A group match is reported to the FAR module along with the group's forwarding vector. This forwarding vector contains the data necessary to forward a frame including a port group number and its enable bit, VLAN ID and its enable bit, priority and its enable bit, sniff bits and an enable bit, and counter index and its enable bit.

When the FAR module receives a group match notification, it will override its normal forwarding decision and data and replace it with enabled portions of the group's forwarding vector. When multiple group matches occur, the logic 60 arbitrates each data field separately based on a simple priority scheme where the lowest numbered group takes precedence for any enabled field. In any conflict, group 0 always wins and group 15 always loses. If a frame has been marked for discard by parts of the logic 60 other than the Broadcast Limit counters, and not because its Pgroup was the discard Pgroup, then the OMF is unable to change this decision. To state this another way, an OMF match blocks the action of the Broadcast Limit counters and can redirect a frame from the discard Pgroup elsewhere, but otherwise discarded frames stay that way.

The filters and groups are programmed through a common register set. A particular filter is selected by writing its 6-bit index value into the filter/group select register. Once the filter index value has been set, all of the registers for the selected filter are available for read/write operations, and the filter will not match any frame data. It must be unselected to begin filtering.

A particular group is selected by writing its 4-bit index value into the filter/group select register. Once the group index value has been set, all of the registers for the selected group are available for read/write operations.

0x130 Filter/Group Select (V2 ASIC)–[R/W] This register selects one of the logic 60's 64 filters and one of its 16 filter groups for modification. The selected filter and groups' registers are available via the shared offset mask register address space 0x131–0x13B. Also available here is a self-test facility for chip-level verification.

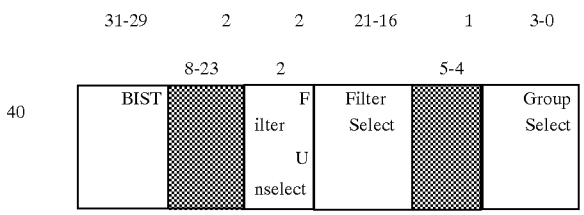

3:0 Group Select: Selects one of the 16 Filter Groups for editing via the Group Control, Mux Select, and Forwarding Vector registers.

21:16 Filter Select: Selects one of 64 filters for editing via the Offset Count & Control, Comparand 0–2 and Mask 0–2 registers. While a filter is selected for editing it will not function as a filter.

23 Filter Unselect. Because a Filter cannot match while it is selected, a way to select no filter is needed. Setting this bit does so.

31:29 BIST: Built-In Self Test. Writing 3'b100 to this field triggers a 512-clock self-test cycle. Bit 29 will be set at the end of this cycle, and Bit 30 will be set if the test failed. 3'b000 must be written back after the test completes to resume normal operation. While testing, normal filter operation will be disrupted, and most OMF registers' contents will be destroyed.

0x131 Filter Group Control (V2 ASIC)–[R/W] This register provides access to the currently selected (0x130) filter group's control register.

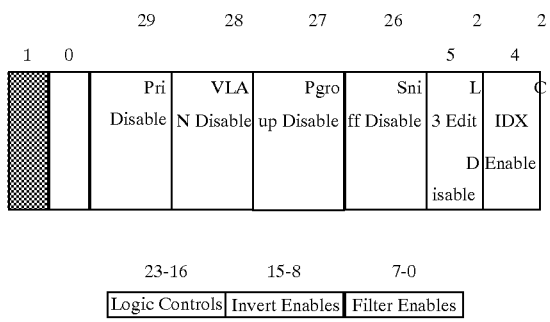

7:0 Filter Enables: Single bit enables for each of the eight filters in a group. Bit 0 enables filter 0, bit 1 filter 1, and so on. When an enable bit is set, that filter's result will be based upon comparand and mask comparisons to frame data. When the enable bit is cleared, the filter result will be forced low to indicate a compare failure.

15:8 Invert Enables: Inversion control bits for each of the eight filters in a group. Bit 8 inverts filter 0, bit 9 inverts filter 1, etc. When an invert bit is set, that filter's result will be inverted before it is presented to the group match logic. When the invert bit is cleared, the filter result will be passed unchanged to the group match logic.

23:16 Logic Control. These 8 logic control bits determine how the results of the eight filters within a group are gated together to determine the group's match result. Refer to the diagrams above for functionality, noting that Bit 16 is 0 in the diagram, Bit 17 is 1, etc. A low on a logic control bit selects the AND gating function while a high selects the OR gating function. Bit 23 is special, and selects alternate logic groupings, per the chart.

24 Counter Index Enable. Single bit enable for the CIDX field. When high, the CIDX value in the filter group's forwarding vector will cause the corresponding SA CIDX counter to be incremented for each frame matched by this group. When low, the SA CIDX counters will not be affected by such frames. In either case, when an OMF forwarding vector is applied to a frame the DA CIDX counters are unaffected.

25 L3 Edit Disable. This bit, when set, prevents Layer 3 frame editing (a necessary part of routing) from being done if the Offset Mask Filter group matches. Changes blocked are MAC SA replacement, IP TTL/Hop count changing, and IPX Hop count changing. When cleared, the Offset Mask Filter group will function normally and Layer 3 frame editing will be allowed.

26 Sniff Disable. This bit, when set, prevents the Offset Mask Filter group's forwarding vector from overriding the Sniff bits. When cleared, the Offset Mask Filter group will function normally and will override this portion of the frame's forwarding vector.

27 Pgroup Disable. This bit, when set, prevents the Offset Mask Filter group's forwarding vector from overriding the Destination Port Group. When cleared, the Offset Mask Filter group will function normally and will override this portion of the frame's forwarding vector. This override also sets the OMF bit and clears the Flood and CPU bits in the SPM header, and disables Broadcast Limiting,

28 VLAN Disable. This bit, when set, prevents the Offset Mask Filter group's forwarding vector from overriding the VLAN ID. When cleared, the Offset Mask Filter group will function normally and will override this portion of the frame's forwarding vector.

29 Priority Disable. This bit, when set, prevents the Offset Mask Filter group's forwarding vector from overriding the frame's priority. When cleared, the Offset Mask Filter group will function normally and will override this portion of the frame's forwarding vector.

30 Q. This bit, when set, sets the Q bit in the forwarding decision logic if the Offset Mask Filter group matches. This extracts and translates an IP frame's Precedence field into an internal priority, overriding its original priority. For Layer 3 IP frames, if Q is set and Priority Disable (bit 29) is clear, the frame's priority will be translated and will replace the frame's IP Precedence field, provided that 1) the L3 Edit Disable bit is not set, and 2) this is not an IPv4 frame with an invalid version or with header extensions.

31 Reserved.

0x132 Group Mux Select 0 (V2 ASIC)–[R/W] This register provides access to one half the currently selected (0x130) filter group's multiplexer select registers. (Warning: Due to the internal implementation necessary to cram 16 groups into the chip, writing to this register also writes to Group Mux Select 1. If you always write both registers in the order 0, 1, then this will not be a problem.)

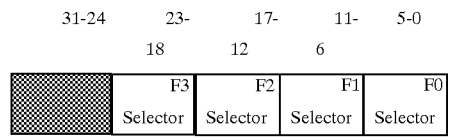

5:0 F0 Selector: Selects which of the 64 Filters is to be the group's F0.

11:6 F1 Selector: Selects which of the 64 Filters is to be the group's F1.

17:12 F2 Selector: Selects which of the 64 Filters is to be the group's F2.

23:18 F3 Selector: Selects which of the 64 Filters is to be the group's F3.

31:24 Reserved.

0x133 Group Mux Select 1 (V2 ASIC)–[R/W] This register provides access to one half the currently selected (0x130) filter group's multiplexer select registers.

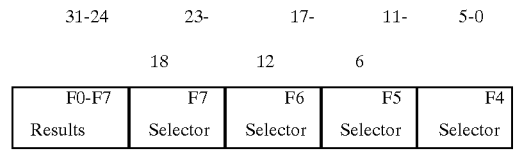

5:0 F4 Selector: Selects which of the 64 Filters is to be the group's F4.

11:6 F5 Selector: Selects which of the 64 Filters is to be the group's F5.

17:12 F6 Selector: Selects which of the 64 Filters is to be the group's F6.

23:18 F7 Selector: Selects which of the 64 Filters is to be the group's F7.

31:24 F0–F7 Results [Read Only]: For testing purposes, the single-bit Match status of the eight filters in the group is available here. F0 is in bit 24, F1 in bit 25, etc. Status will be valid until the next frame is processed.

0x134 Offset Mask Forwarding Vector (V2 ASIC)–[R/W] This register provides access to the currently selected (0x130) filter group's forwarding vector register.

| 1 | 9 | 8 | 7 | 6 | | | |
|---|---|---|---|---|---|---|---|
| Pri ority | VLAN ID | Por t GROUP | | | 1 | 2 | IDX |

4:0 Counter Index: 5-bit index indicating which SA index counter should be incremented if index counters are enabled for this group.

5 S2: Single bit indicating the frame should be sent to Sniff Resource 2.

6 S1: Single bit indicating the frame should be sent to Sniff Resource 1.

16:7 Port Group: 10-bit forwarding port group used in the Receive Notification message. Note that if this field matches the Discard Port Group, the frame will be dropped unless S1 or S2 is set.

28:17 VLAN ID: 12-bit VLAN ID number to be used when forwarding the frame. This number is placed in the SPM Header for all frames. For tagged frames, this value also replaces the VLAN number in the frame's tag.

31:29 Priority: 3-bit priority value used to forward the frame. This value is placed in the SPM Header and, for tagged frames, it also replaces the priority in the frame's tag.

0x135 Offset Count & Control (V2 ASIC)–[R/W] This register provides access to the currently selected (x130) filter's Offset Count, Protocol, and Port Sensitivity registers. The 6-bit offset count value is a 4 byte word offset from the front of either the frame or its L3 payload data which establishes the start point for this filter's compare logic.

| 31-21 | 20-17 | 16 | 15-6 | 5-0 |
|---|---|---|---|---|
| | Protocol | Port Sens. | | Offset |

5:0 Offset: 6-bit offset count value is a 4 byte word offset from either the front of the frame or the front of the L3 payload which establishes the start point for this filter's compare logic. If the last word (containing all or part of the FCS) or the 64$^{th}$ word of the frame is reached before all three comparand words are used, the frame will not match. Because the logic 60 does not necessarily hold onto a frame until it's completely received, it is unable to match beyond 256 bytes into a frame.

15:6 Reserved.

16 Port Sensitivity: If this bit is set, The low-order 5 bits of both Comparand Word 2 and Mask Word 2 will be ignored for the purposes of filtering, and instead will be used as 10 port match bits. If the Port Match bit corresponding to the port the frame came in on is set, the Filter can match. If it is clear, the Filter cannot match.

20:17 Protocol: This 4-bit value determines whether the Filter matches data from the beginning of the frame (Layer 2) or from the beginning of the Layer 3 part of the frame. If Layer 3 is selected, the Frame's detected protocol must match this protocol value for the Filter to match:

| Value | Protocol |
|---|---|
| 0 | Generic 0 |
| 1 | Generic 1 |
| 2 | Generic 2 |
| 3 | Generic 3 |

-continued

| Value | Protocol |
|---|---|
| 4 | Generic 4 |
| 5 | Generic 5 |
| 6 | Generic 6 |
| 7 | Generic 7 |
| 8 | IPv4 |
| 9 | IPv6 |
| A | MCast IPv4 |
| B | ARP |
| C | IPX |
| D | Apple Talk |
| E | Layer 2 |
| F | Other |

Note that even though a type of encapsulation recognition might be disabled in the PID module (LLC or SNAP), Filters will still be able to match L3 data following the encapsulation data. In these cases, however, the protocol would be Other. OMF is purposely disconnected from as much of the other logic 60 logic as possible, so that it may be used as a 'patch kit'.

31:21 Reserved.

0x136 Filter Comparand Word 0 (V2 ASIC)–[R/W] This register provides access to the currently selected (x130) filter's Comparand Word 0 register. (Warning: Due to the internal implementation necessary to cram 64 filters into the chip, writing to this register also writes to Comparand Word 1 and Comparand Word 2. If you always write all three registers in the order 0, 1, 2, then this will not be a problem.) This word is compared against the frame word located at the Offset Count position. The result of this comparison will be qualified by the Mask Word 0. Any resultant mismatch will result in a fail match status for this filter on this frame.

| Comparand Word 0 |
|---|

0x137 Filter Comparand Word 1 (V2 ASIC)–[R/W] This register provides access to the currently selected (x130) filter's Comparand Word 1 register. (Warning: Due to the internal implementation necessary to cram 64 filters into the chip, writing to this register also writes to Comparand Word 2. If you always write all three registers in the order 0, 1, 2, then this will not be a problem.) This word is compared against the frame word located at the (Offset Count+1) position. The result of this comparison will be qualified by the Mask Word 1. Any resultant mismatch will result in a fail status for this filter on this frame.

| Comparand Word 1 |
|---|

0x138 Filter Comparand Word 2 (V2 ASIC)–[R/W]0 This register provides access to the currently selected (x130) filter's Comparand Word 2 register. This word is compared against the frame word located at the (Offset Count+2) position. The result of this comparison will be qualified by the Mask Word 1. Any resultant mismatch will result in a fail status for this filter on this frame. Warning: If the Port Sensitivity bit is on, the low-order 5 bits (4–0) will be used instead to enable matches of ports 4 through 0. Bit 0 enables Port 0, bit 1 Port 1, etc. For frame matching purposes, these 5 bits will be ignored.

> Comparand Word 2

0x139 Filter Mask Word 0 (V2 ASIC)–[R/W] This register provides access to the currently selected (x130) filter's Mask Word 0 register. (Warning: Due to the internal implementation necessary to cram 64 filters into the chip, writing to this register also writes to Mask Word 1 and Mask Word 2. If you always write all three registers in the order 0, 1, 2, then this will not be a problem.) This word qualifies the results of the Comparand Word 0 comparison. Any bit set in this word will mask the matching bit position and force a true comparison result on that bit.

> Mask Word 0

0x13A Filter Mask Word 1 (V2 ASIC)–[R/W] This register provides access to the currently selected (x130) filter's Mask Word 1 register. (Warning: Due to the internal implementation necessary to cram 64 filters into the chip, writing to this register also writes to Mask Word 2. If you always write all three registers in the order 0, 1, 2, then this will not be a problem.) This word qualifies the results of the Comparand Word 1 comparison. Any bit set in this word will mask the matching bit position and force a true comparison result on that bit.

> Mask Word 1

0x13B Filter Mask Word 2 (V2 ASIC)–[R/W] This register provides access to the currently selected (x130) filter's Mask Word 2 register. This word qualifies the results of the Comparand Word 2 comparison. Any bit set in this word will mask the matching bit position and force a true comparison result on that bit. Warning: If the Port Sensitivity bit is on, the low-order 5 bits (4-0) will be used instead to enable matches of ports 9 through 5. Bit 0 enables Port 5, bit 1 Port 6, etc. For masking purposes, these 5 bits will be treated as being set to 1's.

> Mask Word 2

Having understood the principles of the invention from the embodiments of the invention shown and described herein, those of skill in the art will recognize that the embodiments can be modified in arrangement and detail without departing from such principles. The construction of the various modules can be varied while still providing the functions described. Elements of the various modules can be implemented in hardware, software, or firmware within the context of the invention. For example, the offset value, comparator value, expectant value, etc., can be stored in structure other than filters. The length of words, the number of filters, the number of groups, etc., are all application choices and not limitations of the invention.

In view of the many possible embodiments to which the principles of the invention may be applied, it should be understood that these embodiments are illustrative only and should not be taken as a limitation on the scope of the invention. The invention, rather, is defined by the following claims. We therefore claim as the invention all embodiments that may come within the scope of these claims and their equivalents.

We claim:

1. In a switching device, a method of processing frames received at a sending port and communicated to a destination port, the method comprising:
    storing in the switching device a filter that includes an offset value and a comparator value, the offset value allowing identification of either a header portion or a payload portion of a frame;
    comparing information located at the position in the frame determined by the filter offset value with the comparator value to obtain a filter outcome; and
    processing the frame with the filter outcome.

2. The method of claim 1 wherein processing the frame includes communicating the frame to destination ports using the outcome to determine which destination ports are to receive the frame.

3. The method of claim 1 wherein processing the frame includes setting the priority of the frame using the filter outcome.

4. The method of claim 1 wherein the storing step includes storing a filter that includes an expectant value used in the comparing step.

5. The method of claim 1 wherein the storing step includes storing a filter that includes an anchor value from which the offset value is measured.

6. The method of claim 1 wherein the storing step includes storing a filter that includes a mask value that masks the frame information before comparison with the comparator value.

7. The method of claim 1 wherein there are a multiple of filters in the switching device each performing the steps, the method including:
    combining the filter outcomes to obtain a filter group outcome; and
    processing the frame with the filter group outcome.

8. The method of claim 7 wherein combining the filter outcomes includes logically combining their outcomes.

9. The method of claim 1 including:
    merging the filter outcome with frame forwarding information from another source; and
    processing the frame with the merged outcome.

10. In a switching device, apparatus for processing frames received at a sending port and communicated to a destination port, the apparatus comprising:
    means for storing in the switching device a filter that includes an offset value and a comparator value, the offset value allowing identification of either a header portion or a payload portion of a frame;
    means for comparing information located at the position in the frame determined by the filter offset value with the comparator; and
    means for processing the frame with the filter outcome.

11. The apparatus of claim 10 including means for storing a filter that includes an expectant value used in the means for comparing.

12. The apparatus of claim 10 including means for storing a filter that includes an anchor value from which the offset value is measured.

13. The apparatus of claim 10 including means for storing a filter that includes a mask value that masks the frame information before comparison with the comparator value.

14. The apparatus of claim 10 including:
    means for merging the filter outcome with frame forwarding information from another source; and
    means for processing the frame with the merged outcome.

15. The apparatus of claim 10 including:

means for storing multiple filters in the switching device;

means for combining the filter outcomes to obtain a filter group outcome; and means for processing the frame with the filter group outcome.

16. In a switching device, a method of processing frames received at a sending port and communicated to a destination port, the method comprising:

storing in the switching device an offset value and a comparator value, the offset value allowing identification of either a header portion or a payload portion of a frame;

comparing information located at the position in the frame determined by the offset value with the comparator value to obtain an outcome; and processing the frame with the outcome.

17. The method of claim 16 wherein the offset value and comparator value are associated with a filter.

18. The method of claim 16 wherein there are a multiple sets of offset values, comparator values and related outcomes, the method including:

combining the outcomes to obtain a group outcome; and processing the frame with the group outcome.

19. The method of claim 18 wherein combining the outcomes includes logically combining the outcomes.

20. A switching device supporting content-based forwarding of data packets, the switching device comprising:

an input for receiving the data packet;

a filter for identifying a position within either a header or payload portion of the data packet, the filter further comparing information located in the identified position with a comparator value and returning a filter outcome; and an output for forwarding the data packet or not based on the filter outcome.

21. The switching device of claim 20, further comprising a merging logic for merging the filter outcome with frame forwarding information assigned by a different source.

22. The switching device of claim 21, wherein the merging logic modifies the frame forwarding information assigned by the different source.

23. The switching device of claim 22, wherein the modification comprises modification of a priority assigned to the data packet.

* * * * *

UNITED STATES PATENT AND TRADEMARK OFFICE
CERTIFICATE OF CORRECTION

| | | |
|---|---|---|
| PATENT NO. | : 6,347,087 B1 | Page 1 of 1 |
| APPLICATION NO. | : 09/166318 | |
| DATED | : February 12, 2002 | |
| INVENTOR(S) | : Jayansenan Sundara Ganesh, Timothy S. Michels and James E. Cathey | |

It is certified that error appears in the above-identified patent and that said Letters Patent is hereby corrected as shown below:

<u>Column 16,</u> Ln 23,
After claim 23, insert claim 24 as follows:
-- 24. The switching device of claim 22, wherein the modification comprises modification of a destination address assigned to the data packet. --.

Signed and Sealed this

Nineteenth Day of February, 2008

JON W. DUDAS
*Director of the United States Patent and Trademark Office*